Oct. 3, 1933.  M. EXELMANS  1,929,020
LIGHTING APPARATUS
Filed July 28, 1932  5 Sheets-Sheet 1
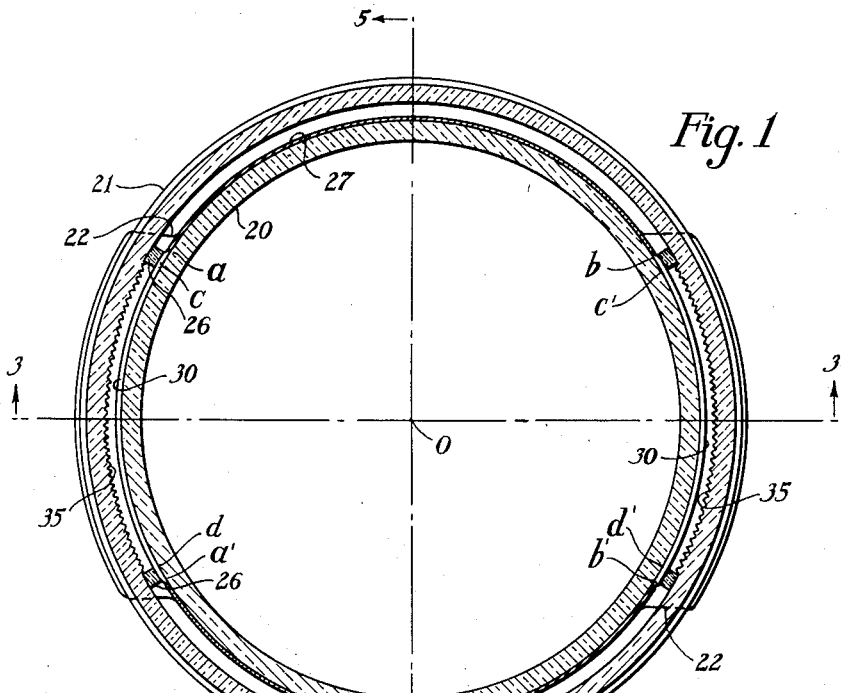
Fig. 1
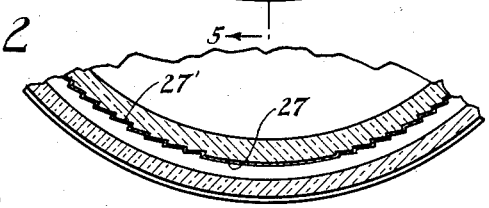
Fig. 2
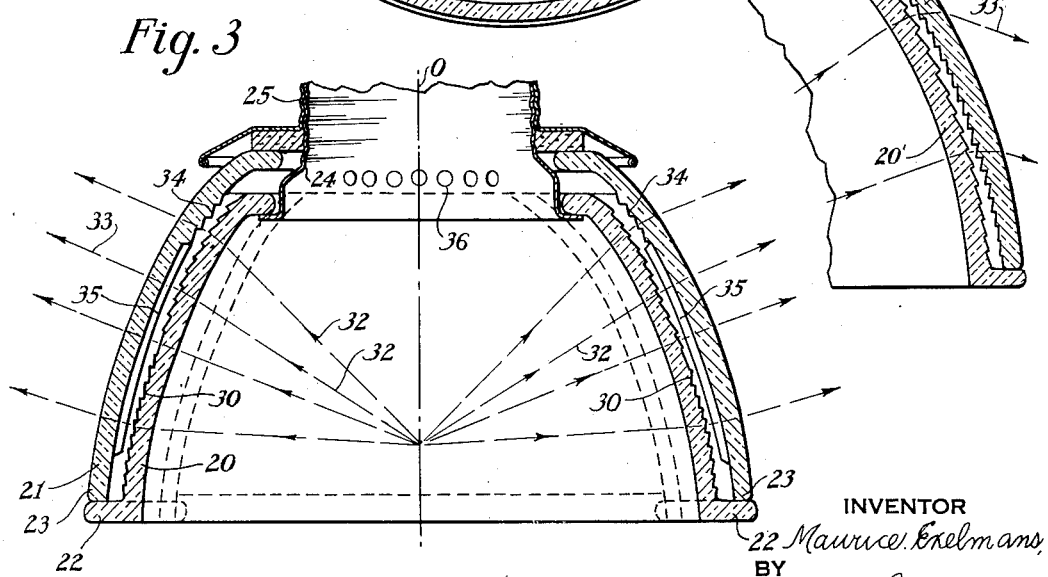
Fig. 3
Fig. 4
INVENTOR
Maurice Exelmans,
BY
Joel B. Liberman
ATTORNEY Oct. 3, 1933.     M. EXELMANS     1,929,020
LIGHTING APPARATUS
Filed July 28, 1932     5 Sheets-Sheet 2

INVENTOR
Maurice Exelmans,
BY
Joel B. Liberman
ATTORNEY

Oct. 3, 1933.  M. EXELMANS  1,929,020
LIGHTING APPARATUS
Filed July 28, 1932   5 Sheets-Sheet 3
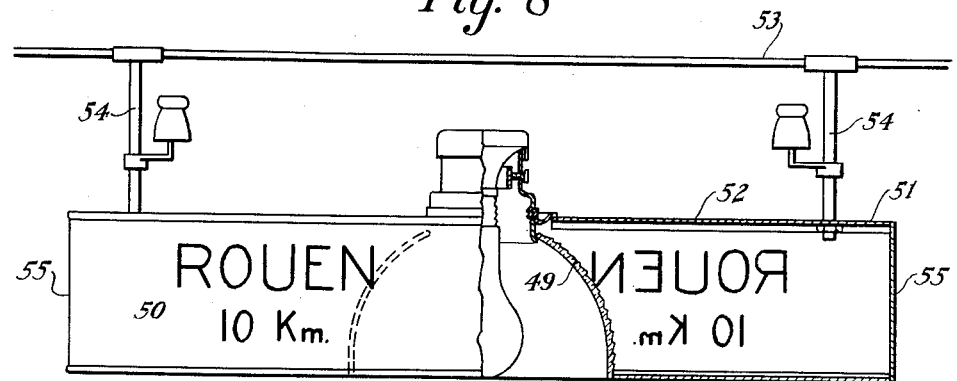
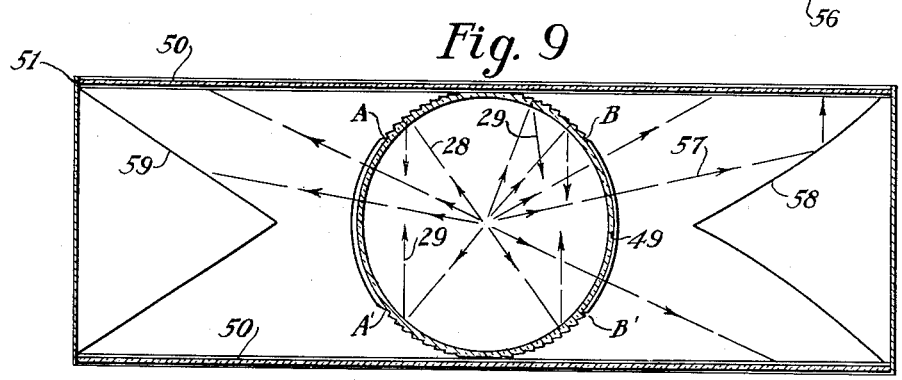
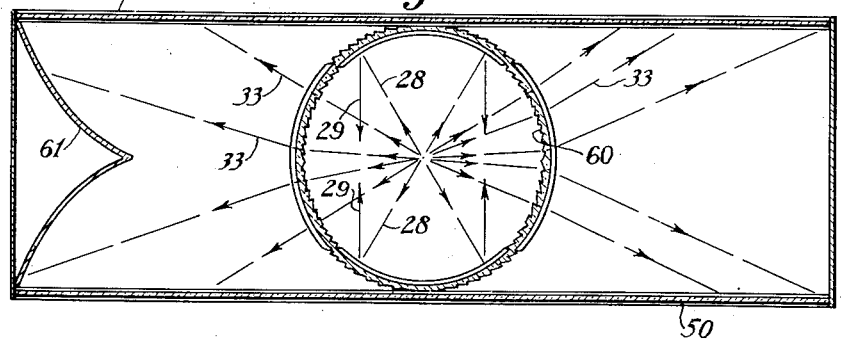
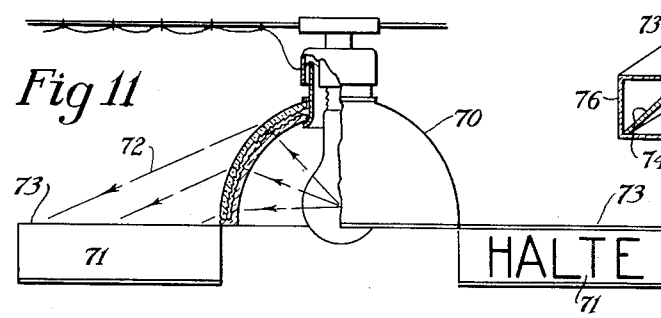
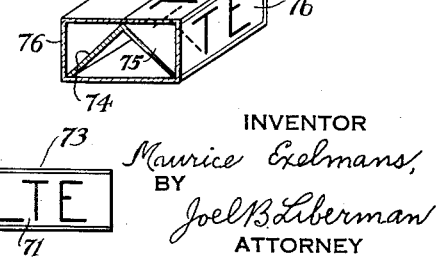
INVENTOR
Maurice Exelmans,
BY
Joel B. Liberman
ATTORNEY Oct. 3, 1933.   M. EXELMANS   1,929,020
LIGHTING APPARATUS
Filed July 28, 1932   5 Sheets-Sheet 4

INVENTOR.
Maurice Exelmans,
BY Joel B Liberman
ATTORNEY.

Patented Oct. 3, 1933

1,929,020

UNITED STATES PATENT OFFICE 1,929,020

LIGHTING APPARATUS

Maurice Exelmans, Paris, France, assignor to Holophane Company, Inc., New York, N. Y., a corporation of Delaware Application July 28, 1932, Serial No. 625,268, and in France August 11, 1931

10 Claims. (Cl. 40—131)

The present invention relates to lighting apparatus and is more particularly directed toward lighting apparatus applicable for combined street or corridor lighting and the lighting of advertising signs, street signs, and the like.

The present invention contemplates lighting apparatus for the above purposes wherein a portion of the light is reflected downwardly into beams for street or corridor lighting and wherein another portion of the light is transmitted in predetermined directions to reach advertising matter or street signs in such a way as to illuminate the same.

According to the present invention, the light control is accomplished by a prismatic glass dome, which may be a single piece of glass or two pieces of glass, one inside the other. The dome has certain zones or sectors provided with prisms for directing the light toward the street signs or advertising matter and other zones or sectors preferably mirrored for reflecting the light for street or corridor lighting.

A further object of the present invention is to provide glassware of the type in which the transparent sectors which do not operate to illuminate the corridor or street, are utilized for the purpose of lighting street signs, sign boards, or other advertising matter. This is accomplished by refracting sectors which are transversely disposed relative to the street so as to permit the lighting of perpendicular sign boards along the street or road. These sign boards receive light rays which would otherwise be difficult to employ for street lighting purposes. The sectors intended for street lighting are placed along the axis of the road or street, and, being opaque, do not interfere with the lighting of the panels.

The transparent sectors for lighting the panels may, according to the present invention, be combined with reflectors of various types, or other constructions assuring the uniformity of the lighting of the panels. These panels may be disposed in various ways relative to the glassware. One can, in some cases, advantageously combine them with mirrors or may arrange the panels for lighting by natural light as well as by artificial light. In the latter case, the prisms are designed to throw the light downwardly.

The accompanying drawings show, for purposes of illustrating the present invention, several embodiments in which the invention may take form, it being understood that the drawings are illustrative of the invention rather than limiting the same. In these drawings:

Fig. 1 is a horizontal section through a combined refractor and reflector arranged for lighting a straight corridor or street and adapted for lighting street signs, or the like;

Fig. 2 is a fragmentary sectional view illustrating a form wherein the reflecting sector includes external silvered prisms;

Fig. 3 is a vertical sectional view taken on the line 3—3 of Fig. 1 to show the transmitting sectors;

Fig. 4 is a fragmentary sectional view similar to Fig. 3, showing a prismatic arrangement designed for sending the light downwardly;

Fig. 8 is a vertical sectional view with parts in elevation showing a modified form of street sign wherein the refractor and reflector are in the form of a single piece of glass;

Figs. 9 and 10 are horizontal sectional views through street signs of the type shown in Fig. 8 and illustrating the path of light rays for street lighting and sign lighting purposes;

Fig. 11 is an elevational view with parts in section illustrating a street sign adapted for illumination either from an artificial source or from natural light;

Fig. 12 is a diagrammatic perspective view of the outer ends of the street sign shown in Fig. 11;

Figure 5:
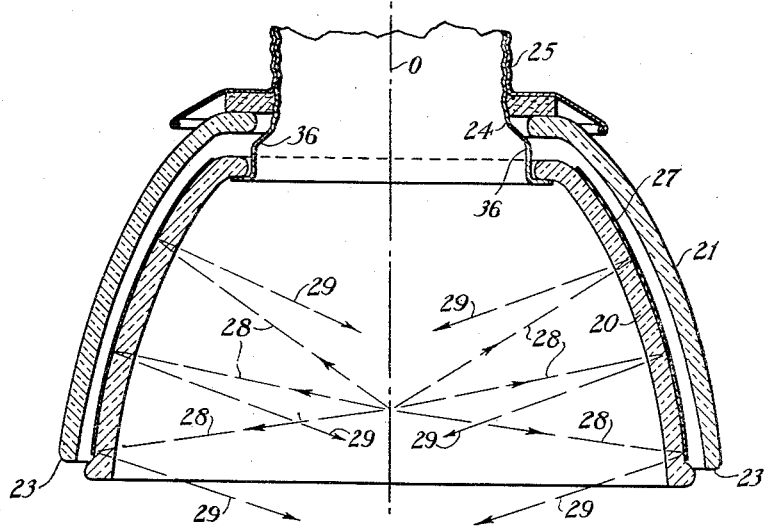
Fig. 5 is a vertical sectional view on the line 5—5 of Fig. 1, illustrating the reflecting of light downwardly into beams for street or road lighting.

The dome or light controlling unit shown in Figs. 1, 3, and 5, is composed of two pieces of glass 20 and 21, having, for example, the form of the surface of revolution about the axis 0. The lower edge of the inner glass member 20 has an outwardly extending flanged portion 22 to receive the lower edge 23 of the outer glass part 21. These two pieces of glass are adapted to be secured together by threaded holders 24 and 25. The flanges 22 do not extend all the way around the glass member 20, there being no flanges in the areas indicated. Rubber strips 26 are placed between the glass members for a purpose to be described.

The internal glass member 20 is provided with sectors a—b, a'—b', having an externally applied reflecting coating of silver indicated at 27. The reflecting sectors permit the illumination of the ground since rays such as 28 are reflected downwardly as indicated at 29. The distribution of rays for the purpose of lighting the ground in a vertical plane, is obtained by varyng the profile of the glassware 21 in the vertical plane (Fig. 5). The profile of the glass may be uniform or variable in the various azimuths. The distribution of the ground rays in horizontal plane may be obtained either by means of altering the profile in a horizontal plane with reference to the glass so that the glass would not be of a surface of revolution or one may employ vertical or prismatic ribbings on the outside surface of the glass, silvered as indicated at 27' in Fig. 2.

The glass member 20 is also provided with transparent sectors c—d, c'—d' having external prisms 30. These prisms act on rays such as 32 to control the vertical angle of the emergent rays 33, directing them obliquely upward as indicated. The distribution of rays in the upwardly directed beam is obtained by the prisms 30 of the glass member 20 and by prisms 34 on the inner surface of glass member 21. The distribution of these rays in a horizontal plane is obtained by the use of small prisms or vertical ribs 35 on the inside of external glass member 21. If desired, one can place the horizontal prisms on the inside of the outer glass member and the longitudinal prisms on the outside of the inner glass member.

The rubber shaped wedges 26 above referred to are located on the boundaries of the different sectors so as to protect the prisms 30 and 34 and ribbings 35 from the dirt. The space between the glass parts 20 and 21, and not closed by the flanges 22, provides a passageway for ventilation so that air can circulate between the two pieces of glass and through suitable spaced openings 36 in the fitter ring 24.

Fig. 4 illustrates an arrangement of prisms on the inner refractor 20' and the outer refractor 21' whereby the light rays will be refracted obliquely downward as indicated at 33' instead of obliquely upward as shown in Fig. 3.

Figure 6:
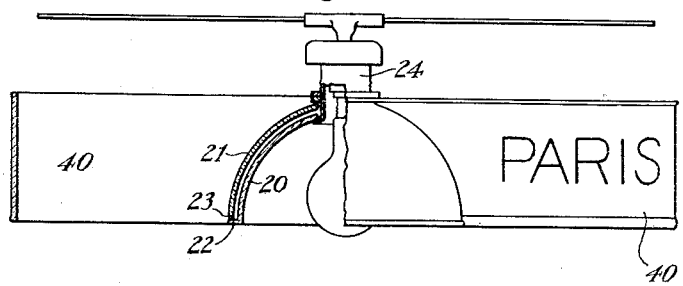
Figs. 6 and 7 are vertical and horizontal sectional views showing the lighting of road signs and the street by glassware such as shown in Figs. 1, 2, 3, and 5.
Figure 7:
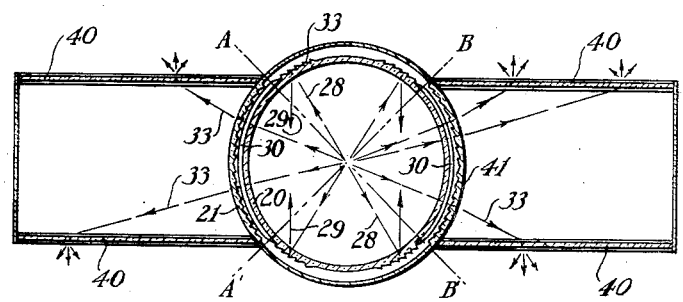

The apparatus shown in Figs. 6 and 7 employs the glass ware substantially the same as that shown in Figs. 1, 2, 3, and 5, and the corresponding reference characters are applied to the same parts. The light reflected by the mirrored sectors A—B, A'—B' is directed along the street or road. While the light transmitted through the prisms 30 is employed for the lighting of panels or street signs 40, distribution of this light may, if desired, be altered by employing vertical prisms 41 on the inner surface of the outer refracting member 21, these prisms being substituted for or supplemental with the ribbings 35. In the arrangement shown in Figs. 6 and 7, a two part glass dome is employed and hence it is not necessary to protect it against dirt. The framing for supporting the glass signs may therefore be open top and bottom.

Figs. 8 and 9 illustrate an arrangement of street advertising signs wherein the width of the sign is slightly greater than the outside diameter of the dome and instead of using a two piece dome, the construction shows the refracting and reflecting elements all included in a single piece 49 of glass. The street signs are indicated by vertical glass panels 50. These panels are secured in a box-like frame 51 closed at the top by means of a roof or cover 52 and suspended from the wire 53 by suspension elements indicated at 54. The frame is also closed at the ends 55 and at the bottom 56, except for the opening provided directly underneath the dome 49. This arrangement affords a closure about the prismatic member so as to keep dirt away from the light transmitting surfaces. The sectors A—B, A'—B' are reflecting and the sectors A—A', and B—B' are transmitting. The transmitted light is emitted as shown at 57 and it may strike vertical, wedge-shaped reflectors 58 of parabolic wedge shape or 59 of plain wedge shape.

Fig. 10 illustrates a device similar in general to that shown in Figs. 8 and 9. The distribution of the transmitted light on to the glass sign is effected by a refractor having internal prisms indicated at 60 which may be supplemented by means of a reflector member 61.

Figs. 11 and 12 show a modification of the invention intended for lighting transparencies by either natural or artificial means. The dome 70 is placed above the signs 71. This is a two part dome whose transmitting sector has the profile indicated in Fig. 4, so that it produces a downwardly oblique beam of light as indicated by the rays 72. The reflecting sector may be the same as above described.

The rays 72 are received by horizontal glass plates 73, 73 which carry lettering or display characters such as indicated. Two mirrors 74, 75 are placed underneath the glass plates 73 and at 45° to the plates so as to reflect the display characters horizontally on to the panels 76. It is obvious that during the day time natural light will pass through the top plate 73 and illuminate the sign.

Figure 13:
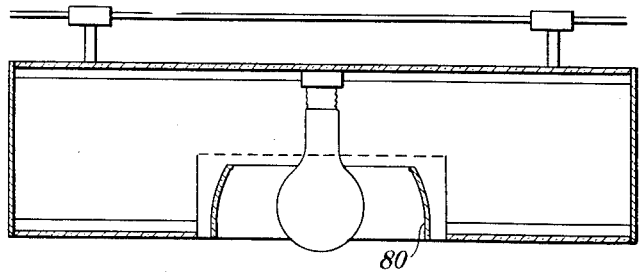
Figs. 13 and 14 illustrate a modification in which the panels have greater height than the reflecting and refracting glass member.
Figure 14:
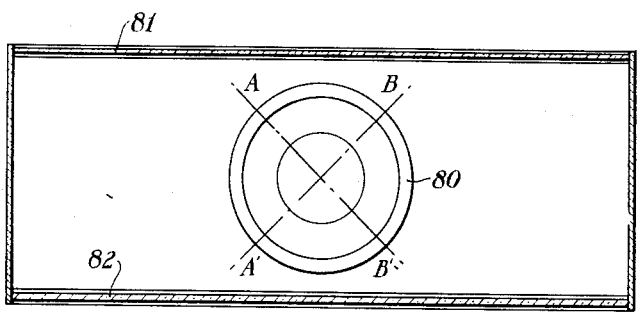
Figure 15:
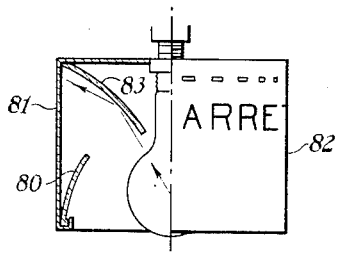
Figs. 15 and 16 illustrate devices for improving the uniformity of the lighting of the panels, Fig. 15 showing a reflector and Fig. 16 a refractor.
Figure 16:
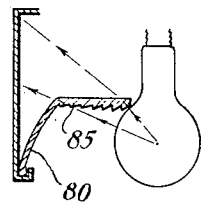

In Figs. 13 and 14 the light controlling glassware is in the form of an annular band or ring 80 open at the top. It has transmitting sectors B—B', A—A' and reflecting sectors A—B, A'—B', and controls the light generally in the manner above described. In order to improve the uniformity of the lighting on the panels 81, 82, one can employ a reflector such as indicated at 83 in Fig. 15, or the bowl 80 with circular distributing prisms as indicated at 85 in Fig. 16.

Figure 17:
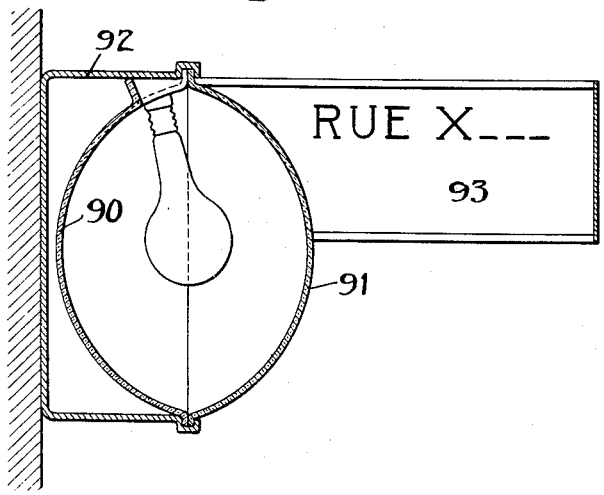
Figs. 17 and 18 are section and plan views of apparatus adapted to be placed at the side of the street or corridor.
Figure 18:
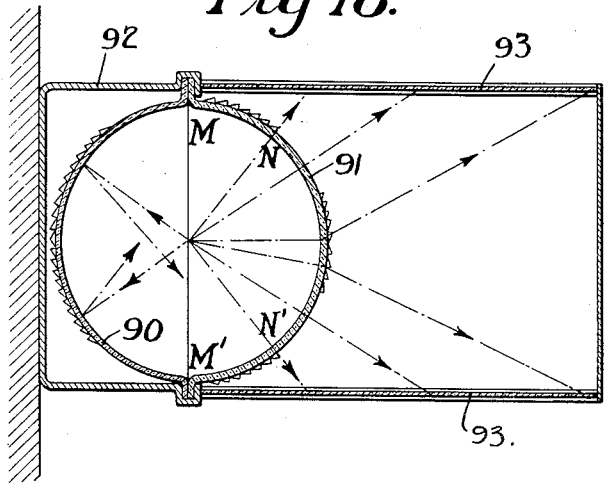

Figs. 17 and 18 show a form of apparatus adapted to be placed on the side of the street or corridor. The glass ware is molded in two parts 90 and 91 and enclosed in a housing 92. The entire surface of glass part 90 is silvered while the right half is silvered only from M to N and M' to N', the transparent sector N N' being intended to light the panels 93 placed on both sides of the glassware. This transparent sector is relatively of greater dimension than is used for apparatus for aviation on account of the speical asymmetric features in this type of apparatus.

It is obvious that the invention may be embodied in many forms and constructions, and I wish it to be understood that the particular forms shown are but a few of the many forms. Various modifications and changes being possible, I do not otherwise limit myself in any way with respect thereto.

What is claimed is:

1. Lighting apparatus for corridor or street lighting and for the illumination of signs comprising a light source, a downwardly opening glass dome about the light source, the dome having opposite reflecting sectors shaped to produce beams of light projected obliquely downward for corridor or street lighting, and opposite prismatic light transmitting sectors for producing horizontally divergent beams of light in controlled vertical angles, and signs outside the glass envelope onto which the transmitted light falls for illumination thereby.

2. Lighting apparatus as defined in claim 1, wherein the reflecting sector is formed by externally silvering the envelope.

3. Lighting apparatus as defined in claim 1, wherein the transmitting sector is provided with vertical prisms for decreasing the horizontal divergence of the light.

4. Lighting apparatus as defined in claim 1, having wedge shaped reflectors to intercept the less divergent transmitted light and redistribute it onto the signs.

5. Lighting apparatus as defined in claim 1, wherein the horizontal angles between the axes of the reflected and transmitted beams are substantially 90° and the signs are parallel with the axis of the divergent transmitted beams.

6. Lighting apparatus for corridor or street lighting and for the illumination of signs comprising a light source, a downwardly opening glass dome about the light source, a pair of translucent parallel signs on opposite sides of the dome, the dome having transmitting sectors for directing light onto the signs and reflecting sectors between the transmitting sectors for producing downwardly emitted beams of light for street or corridor lighting.

7. Lighting apparatus for corridor or street lighting and for the illumination of signs comprising a light source, a downwardly opening glass dome about the light source, parallel vertical frames on opposite sides of the dome, translucent glass signs carried in the frames, the dome having transmitting sectors for directing light onto the signs and reflecting sectors between the transmitting sectors for producing downwardly emitted beams of light for street or corridor lighting.

8. Lighting apparatus for corridor or street lighting and for the illumination of signs comprising two parallel vertical frames, translucent glass signs received in the frames, a downwardly opening glass dome centrally disposed between the frames, and a light source inside the dome, the portions of the dome adjacent the glass signs being reflecting and of such vertical profile as to direct light obliquely downward for street or corridor lighting, the portions of the dome between the reflecting sectors being provided with horizontal and vertical prisms for transmitting light toward the inner surface of the glass signs.

9. Lighting apparatus for corridor or street lighting and for the illumination of signs comprising two parallel vertical frames, translucent glass signs received in the frames, a downwardly opening glass dome centrally disposed between the frames, and a light source inside the dome, the portions of the dome adjacent the glass signs being reflecting and of such vertical profile as to direct light obliquely downward for street or corridor lighting, the portions of the dome between the reflecting sectors being provided with horizontal and vertical prisms for transmitting light toward the inner surface of the glass signs, the frame also carrying wedge shaped reflectors for intercepting the less divergent transmitted light and reflecting it onto the outer ends of the signs.

10. Lighting apparatus for corridor or street lighting and for the illumination of signs comprising a rectangular box-like frame having opposite open side walls, closed end walls and closed at the top and bottom except for central openings, a downwardly opening glass dome housed in the box and extending from between the top and bottom openings, a light source in the dome, and translucent sign panels in the side openings, the glass dome having prismatic transmitting sectors for directing a portion of the light toward the signs, and reflecting sectors for directing a portion of the light into two obliquely downward beams for street or corridor lighting.

MAURICE EXELMANS.